United States Patent
Selander et al.

(10) Patent No.: US 12,452,083 B2
(45) Date of Patent: Oct. 21, 2025

(54) SECURITY FOR GROUP COMMUNICATION (71) Applicant: Telefonaktiebolaget LM Ericsson (publ), Stockholm (SE)

(72) Inventors: Göran Selander, Bromma (SE); John Mattsson, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/767,685

(22) PCT Filed: Nov. 30, 2018

(86) PCT No.: PCT/EP2018/083144
§ 371 (c)(1),
(2) Date: May 28, 2020

(87) PCT Pub. No.: WO2019/110445
PCT Pub. Date: Jun. 13, 2019

(65) Prior Publication Data
US 2020/0389322 A1    Dec. 10, 2020

Related U.S. Application Data (60) Provisional application No. 62/595,638, filed on Dec. 7, 2017.

(51) Int. Cl.
*H04L 9/32* (2006.01)
*H04L 9/08* (2006.01)
(Continued)

(52) U.S. Cl.
CPC .......... *H04L 9/3255* (2013.01); *H04L 9/0819* (2013.01); *H04L 9/30* (2013.01); *H04L 63/065* (2013.01); *H04L 65/403* (2013.01)

(58) Field of Classification Search
CPC ....... H04L 9/3255; H04L 9/30; H04L 9/0819; H04L 63/065; H04L 65/403
See application file for complete search history.

(56) References Cited

U.S. PATENT DOCUMENTS

| | | | | |
|---|---|---|---|---|
| 6,697,946 B1 * | 2/2004 | Miyaji | ................. | H04L 9/3066 713/180 |
| 7,127,613 B2 * | 10/2006 | Pabla | .................... | H04L 9/0891 380/278 |

(Continued)

FOREIGN PATENT DOCUMENTS

| | | | |
|---|---|---|---|
| EP | 898216 A2 | * | 2/1999 |
| JP | 2009246657 A | * | 10/2009 |

OTHER PUBLICATIONS

Keoh, et al., "DTLS-based Multicast Security in Constrained Environments", 2014, DICE Working Group Internet-Draft, pp. 1-14, 2014 (Year: 2014).*

(Continued)

*Primary Examiner* — John B King
*Assistant Examiner* — Alex D Carrasquillo
(74) *Attorney, Agent, or Firm* — Sage Patent Group (57) ABSTRACT

A method for enabling secure group communication in a communication network is performed in a sending node and includes providing signature verification related information to a plurality of listening nodes and sending a group message to the plurality of listening nodes, the group message including signature verification related information of the sending node. A method, nodes, computer programs, and a computer program product enabling secure group communication in a communication network are also presented.

15 Claims, 6 Drawing Sheets

Alternative A: Signature related information is carried in an existing message field, e.g. "Fragment".

| Type |
|---|
| Version |
| Length |
| Fragment |

Alternative B: Signature related information is carried in a new message field ("Sig-info")

| Type |
|---|
| Version |
| Length |
| Fragment |
| Sig-info |

Alternative C: Signature related information is carried in a new record type ("Sig-info")

| Sig-info |
|---|

(51) Int. Cl.
*H04L 9/30* (2006.01)
*H04L 9/40* (2022.01)
*H04L 29/06* (2006.01)
*H04L 65/403* (2022.01)

(56) References Cited

U.S. PATENT DOCUMENTS

| | | | | |
|---|---|---|---|---|
| 8,646,041 | B2* | 2/2014 | Urien | H04L 9/321 |
| | | | | 713/150 |
| 8,966,267 | B1* | 2/2015 | Pahl | H04L 9/3268 |
| | | | | 713/171 |
| 9,621,353 | B2* | 4/2017 | Elwell | H04L 63/0823 |
| 10,693,760 | B2* | 6/2020 | Logue | H04L 12/4625 |
| 2004/0054899 | A1* | 3/2004 | Balfanz | H04L 63/0823 |
| | | | | 713/168 |
| 2004/0092310 | A1* | 5/2004 | Brosnan | G07F 17/3241 |
| | | | | 463/42 |
| 2006/0168446 | A1* | 7/2006 | Ahonen | H04L 9/0836 |
| | | | | 713/163 |
| 2008/0095360 | A1* | 4/2008 | Vuillaume | H04L 9/3236 |
| | | | | 713/180 |
| 2009/0006844 | A1* | 1/2009 | Wing | H04L 63/126 |
| | | | | 709/227 |
| 2011/0185180 | A1* | 7/2011 | Gullberg | H04L 9/3247 |
| | | | | 713/176 |
| 2012/0096274 | A1* | 4/2012 | Campagna | H04L 9/3242 |
| | | | | 713/176 |
| 2013/0246798 | A1 | 9/2013 | Buckley et al. | |
| 2016/0191543 | A1* | 6/2016 | Liu | H04L 63/123 |
| | | | | 726/3 |
| 2016/0269368 | A1* | 9/2016 | Choi | H04L 63/0428 |
| 2017/0099138 | A1* | 4/2017 | Albrecht | H04L 63/065 |
| 2017/0366358 | A1* | 12/2017 | Lyubashevsky | H04L 9/3221 |
| 2018/0083774 | A1* | 3/2018 | Tazzari | H04L 9/16 |
| 2022/0051314 | A1* | 2/2022 | Enkhtaivan | H04L 9/3218 |

OTHER PUBLICATIONS

Keoh, et al.; "DTLS-based Multicast Security in Constrained Environments", 2014 (Year: 2014).*
Keoh et al.; "DTLS-based Multicast Security in Constrained Environments, 2014"; DICE Working Group (Year: 2014).*
Keoh et al. "DTLS-based Multicast Security in Constrained Environments", whole document, May 5, 2014 (Year: 2014).*
Tschofenig et al. "Transport Layer Security (TLS) / Datagram Transport Layer Security (DTLS) Profiles for the Internet of Things (RFC7925)", IP.com, whole document, Jul. 1, 2016, IPCOM000246976D (Year: 2016).*
Keoh et al., DTLS-based Multicast Security in Constrained Environments, DICE Working Group, pp. 1-14, 2014 (Year: 2014).*
Tschofenig et al., "Transport Layer Security (TLS)/Datagram Transport Layer Security (DTLS) Profiles for the Internet of Things (RFC7925)", IPCOM000246976D, IETF, pp. 1-62 (Year: 2016).*
Hussain et al., Security Analysis of DTLS Structure and its Application to Secure Multicast Communication, 2014, 12th International Conference on Frontiers of Information Technology, pp. 165-169 (Year: 2014).*
Keoh, et al., "DTLS-based Multicast Security in Constrained Environments", 2014, DICE Working Group Internet-Draft, pp. 1-14 (Year: 2014).*
Tschofening et al., "Transport Layer Security (TLS)/Datagram Layer Security (DTLS) Profiles for the Internet of Things (RFC7925)", IPCOM000246976D, IETF, pp. 1-62 (Year: 2016).*
PCT International Search Report and Written Opinion mailed Jan. 16, 2019 for International Application No. PCT/EP2018/083144, 13 pages.
Tiloca, Marco, "Efficient Protection of Response Messages in DTLS-Based Secure Multicast Communication"; Security of Information and Networks; Sep. 9, 2014; New York, USA; pp. 466-472 (7 pages).
Tiloca et al., "Secure Two-Way DTLS-Based Group Communication in the IoT"; Internet Engineering Task Force; Oct. 14, 2015; Geneva, Switzerland; pp. 1-35 (35 pages).
Tiloca et al., "Secure group communication for CoAP"; Internet Engineering Task Force; Oct. 12, 2016; Geneva, Switzerland; 15 pages.
Keoh et al., "DTLS-based Multicast Security in Constrained Environments"; Internet Engineering Task Force; Jul. 3, 2014; Geneva, Switzerland; 22 pages.
Iyengar et al., "QUIC: A UDP-Based Multiplexed and Secure Transport"; Internet Engineering Task Force; Feb. 21, 2020; 174 pages.
Federal Information Processing Standards Publication 186-3, "Digital Signature Standard (DSS)"; Computer Security—Cryptography; Information Technology Laboratory, National Institute of Standards and Technology; Jun. 2009; 131 pages.
Dierks et al., "The Transport Layer Security (TLS) Protocol; Version 1.2"; Network Working Group; Aug. 2008; 104 pages.
Rescorla et al., "Datagram Transport Layer Security Version 1.2"; Internet Engineering Task Force; Jan. 2012; 32 pages.
Wouters et al., "Using Raw Public Keys in Transport Layer Security (TLS) and Datagram Transport Layer Security (DTLS)"; Internet Engineering Task Force; Jun. 2014; 18 pages.
Rahman et al., "Group Communication for the Constrained Application Protocol (CoAP)"; Internet Engineering Task Force; Oct. 2014; 46 pages.

* cited by examiner

Fig. 1

Alternative A: Signature related information is carried in an existing message field, e.g. "Fragment".

| Type |
|---|
| Version |
| Length |
| Fragment |

Alternative B: Signature related information is carried in a new message field ("Sig-info")

| Type |
|---|
| Version |
| Length |
| Fragment |
| Sig-info |

Alternative C: Signature related information is carried in a new record type ("Sig-info")

| Sig-info |
|---|

SECURITY FOR GROUP COMMUNICATION

CROSS-REFERENCE TO RELATED APPLICATIONS

This application is a 35 U.S.C § 371 national stage application for International Application No. PCT/EP2018/083144, entitled "SECURITY FOR GROUP COMMUNICATION", filed on Nov. 30, 2018, which itself claims priority to U.S. Provisional Patent Application No. 62/595,638, filed on Dec. 7, 2017, the disclosures and contents of which are hereby incorporated by reference in their entireties.

TECHNICAL FIELD

The invention relates to methods for enabling security for group communication in a communication network, sending nodes, listening nodes, computer programs and a computer program product thereof.

BACKGROUND

The transport layer security (TIS) protocol, version 1.2, request for comments (RFC) RFC5246, is widely deployed to protect client-to-server communication on the Internet, for example in hypertext transfer protocol secure (HTTPS) which indicates that HTTP communication is protected with TIS, and typically transported over transmission control protocol (TCP) and internet protocol (IP).

The datagram TI (DTIS) protocol, version 1.2, IETF RFC6347, is very similar to TIS, but can also run over unreliable transport such as user datagram protocol (UDP) instead of reliable TCP. DTIS is used in Internet-of-Things (IoT) deployments, since networks with high packet data loss or high latency have better performance with UDP.

In both TIS and DTIS, the protocol comprises a key exchange protocol, known as the handshake, and a record layer protocol which protects the traffic.

The handshake authenticates a TIS server and optionally the TIS client based on some pre-existing secret information such as a pre-shared symmetric keys or a private signature key corresponding to a public signature key. In either case, the handshake protocol, if successful, results in symmetric session keys being established between TIS client and TLS server which are used in the record layer protocol to encrypt and integrity protect the traffic.

However, in some settings, the use of multicast communication provides a more efficient mode of communication than point-to-point communication between a single TIS client and a TIS server. Reasons for using multicast may include:
- when the same information is relevant for a group of nodes and where bandwidth is scarce so sending the same information individually to a large number of nodes is not cost efficient, or
- in order to comply with certain latency requirements many nodes may need to acquire the same information in a timely manner, e.g. in a synchronized orchestration of something, such as an emergency situation.

Multicast is also used in many IoT scenarios, e.g. building automation where multiple sensors or actuators need to be contacted at the same time, in particular in lighting systems where deployments often have strict requirements e.g. for delays in turning on lights. One preferred mechanism for secure multicast is described in Group Communication for the Constrained Application Protocol (CoAP), IETF RFC7390. CoAP is a lightweight HTIP-like protocol suitable for IoT for which security is provided by DTIS, see IETF RFC7252.

Extensions of record layer to multicast have been proposed, for example as in DTIS-based Multicast Security in Constrained Environments, of the IETF Internet Draft draft-keoh-dice-multicast-security-08, that proposes to use the DTIS 1.2 record layer with symmetrical group keys but does not specify how the group keys are distributed.

SUMMARY

It is an object of the invention to enable enhanced security for group communication in a communication network.

A transport layer security (TIS) protocol may be augmented with signature verification related information enabling the authentication of the sender in a setting where there may be multiple candidate senders.

According to a first aspect, there is presented a method for enabling secure group communication in a communication network. The method is performed in a sending node and comprising providing signature verification related information to a plurality of listening nodes, and sending a group message to the plurality of listening nodes, the group message comprising signature verification related information of the sending node.

At least part of the signature verification related information may be provided by a key exchange procedure.

At least part of the signature verification related information may be provided by a key distribution procedure.

At least part of the signature verification related information may be provided by a record layer procedure.

The signature verification related information may be one or more of the following: a digital signature, a signature with message recovery, compressed or partial signature information, and an indication of where or how to retrieve a signature, a public signature key, an indication of where or how to retrieve a public signature key.

The signature verification related information may be comprised in a message field intended for other use.

The signature verification related information may be comprised in a message field dedicated for signature verification related information.

The group message, one or more fields of the group message, or the whole group message, may be encoded with a private signature key related to the signature verification related information.

The providing step may comprise one or more of the following: providing parts of the signature verification related information by handshake protocols with one or more listening nodes or by record layer protocols with one or more listening nodes. The parts of the signature verification related information may be parts of a public signature key.

The group message may be a record layer transport layer security, TIS, multicast message. The TIS multicast message may be sent in the record layer for version 1.2. The group message may be sent without message authentication code, MAC.

According to a second aspect there is presented a method for enabling secure group communication in a communication network. The method is performed in a listening node and comprising obtaining signature verification related information from a sending node, and receiving a group message from the sending node comprising signature verification related information of the sending node.

At least part of the signature verification related information may be obtained by a key exchange procedure.

At least part of the signature verification related information may be obtained by a key distribution procedure.

At least part of the signature verification related information may be obtained by a record layer procedure.

The signature verification related information may be one or more of the following: a digital signature, a signature with message recovery, compressed or partial signature information, and an indication of where or how to retrieve a signature, a public signature key, an indication of where or how to retrieve a public signature key.

The signature verification related information may be comprised in a message field intended for other use.

The signature verification related information may be comprised in a message field dedicated for signature verification related information.

The group message, one or more fields of the group message, or the whole group message, may be encoded with a private signature key related to the signature verification related information, and the sending node is verified by a public signature key related to the signature verification related information.

The obtaining step may comprise one or more of the following: obtaining a public signature key by a handshake protocol with the sending node or by a record layer protocol with the sending node.

The group message may be a record layer transport layer security, TIS, multicast message. The TIS multicast message may be received in the record layer for version 1.2. The group message may be sent without message authentication code, MAC.

According to a third aspect there is presented a sending node for enabling secure group communication in a communication network. The sending node comprises a processor and a computer program product. The computer program product stores instructions that, when executed by the processor, causes the sending node to provide signature verification related information to a plurality of listening nodes, and to send a group message to the plurality of listening nodes, the group message comprising signature verification related information of the sending node.

According to a fourth aspect there is presented a listening node for enabling secure group communication in a communication network. The listening node comprises a processor and a computer program product. The computer program product stores instructions that, when executed by the processor, causes the listening node to obtain signature verification related information from a sending node, and to receive a group message from the sending node comprising signature verification related information of the sending node.

According to a fifth aspect there is presented a sending node for enabling secure group communication in a communication network. The sending node comprises a communication manager for providing signature verification related information to a plurality of listening nodes, and for sending a group message to the plurality of listening nodes (, the group message comprising signature verification related information of the sending node.

According to a sixth aspect there is presented a listening node for enabling secure group communication in a communication network. The listening node comprises a communication manager for obtaining signature verification related information from a sending node, and for receiving a group message from the sending node comprising signature verification related information of the sending node.

According to a seventh aspect there is presented a computer program for enabling secure group communication in a communication network. The computer program comprises computer program code which, when run on a sending node, causes the sending node to provide signature verification related information to a plurality of listening nodes, and to send a group message to the plurality of listening nodes, the group message comprising signature verification related information of the sending node.

According to an eighth aspect there is presented a computer program for enabling secure group communication in a communication network. The computer program comprises computer program code which, when run on a listening node, causes the listening node to obtain signature verification related information from a sending node, and to receive a group message from the sending node comprising signature verification related information of the sending node.

A computer program product comprising a computer program and a computer readable storage means on which the computer program is stored is also presented.

Generally, all terms used in the appended claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

If the TIS Record Layer protocol is used to protect multicast communication of e.g. CoAP as described in prior art, the parties involved in the communication needs to trust that no node is impersonating another node in the multicast group. The verification of a message requires access to the same key as was used to generate the protected message, so in order to verify messages each node in the group needs to have access to each others key used for generating the protected message. In other words, the existing multicast solutions based on Record Layer require nodes to share the same key material and does not allow the node to authenticate the source of the message.

This invention relates to securing group communications, in particular multicast, with the Transport Layer Security (TIS) protocol.

The TLS protocol will be discussed further in more detail, although analogous changes can be made to the DTLS protocol.

The quick UDP Internet connection (QUIC) protocol reuses the TIS handshake but defines its communication security protocol replacing the record layer, and analogous changes can be made to that protocol.

One component of the solution is to augment the Record Layer protocol message with additional information allowing the receiver to acquire a digital signature covering a part or all of the Record Layer message and potentially additional data not sent with the record layer that needs to be authenticated. For TLS the additional data could e.g. be the sequence number of one of the protected records or other data that needs to be authenticated and that can be assumed to be or become known by the receiving party.

As an example, a digital signature may be included in the message. In another example the information in the message may provide location or other information about how to acquire a published signature of the message.

Another component of the solution is to enable the listener to acquire the public signature key of a sender. In one example information about the public signature key may be transferred with the Handshake protocol. In another example information about the public signature key may be transferred in the Record Layer. Information about the public signature key may be the public signature key itself or information how to verify and/or acquire the public signature key.

Such signature verification related information (digital signatures, public signature key, location information of any of these, etc.) may be acquired in parts at different times using multiple instances of handshake or record layer protocols. Parts of this information may be acquired by other means, e.g. using a key distribution protocol.

With access to the protected TLS message, its digital signature and the sender public signature key, the listener can verify that the signature of the message was made by the sender and thus infer the source of the message.

The solution provides source authentication in multicast setting using specific TIS components.

The solution is a minor extension based on the widely deployed TIS and thereby augments TIS to also support secure multicast.

Setting

Figure 1:
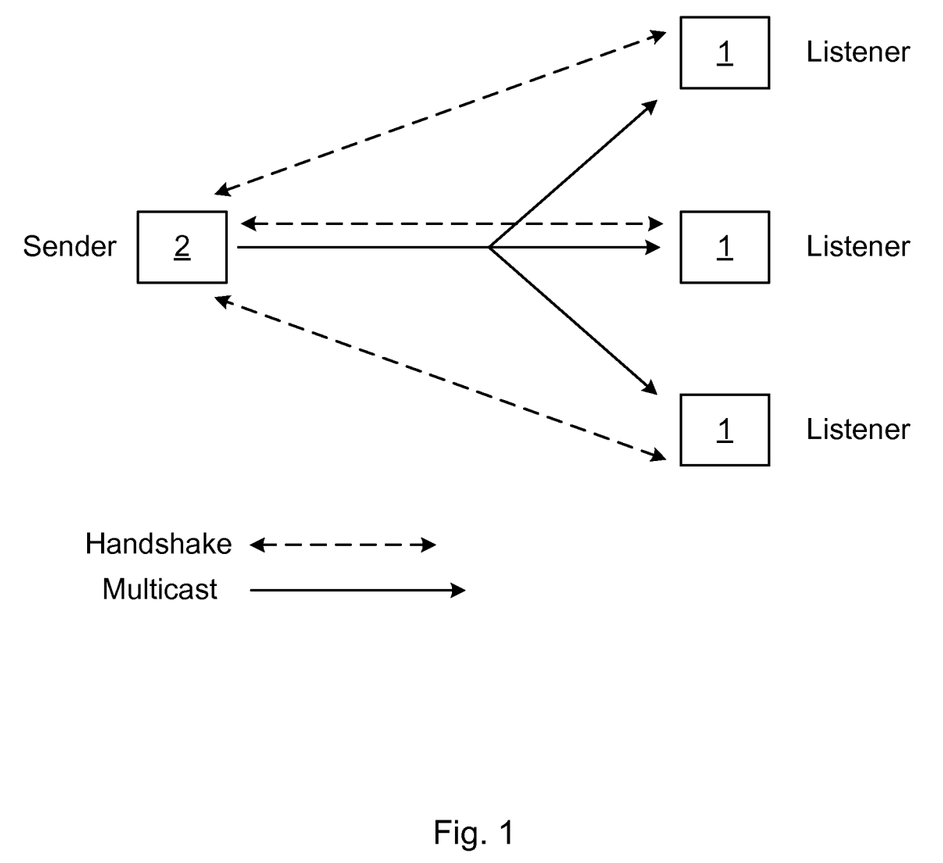
FIG. 1 schematically illustrates group communication.

A setting where a number of nodes may be involved in group communication is illustrated in FIG. 1. Each message may have different senders and potentially more than one node is a candidate listener. The nodes implement TIS record layer and optionally the TIS Handshake.

The group communication can be any one-to-many communication, such as broadcast, multicast, geocast, or a combination of several unicast/anycast. The lower layers do not need to be the same over the whole path. The group communication can e.g. be IP multicast as in [DTIS-based Multicast Security in Constrained Environments], but other mechanisms such as a broadcast channel of some radio technology or several unicast channels are also contemplated.

Message Format

Figure 2:
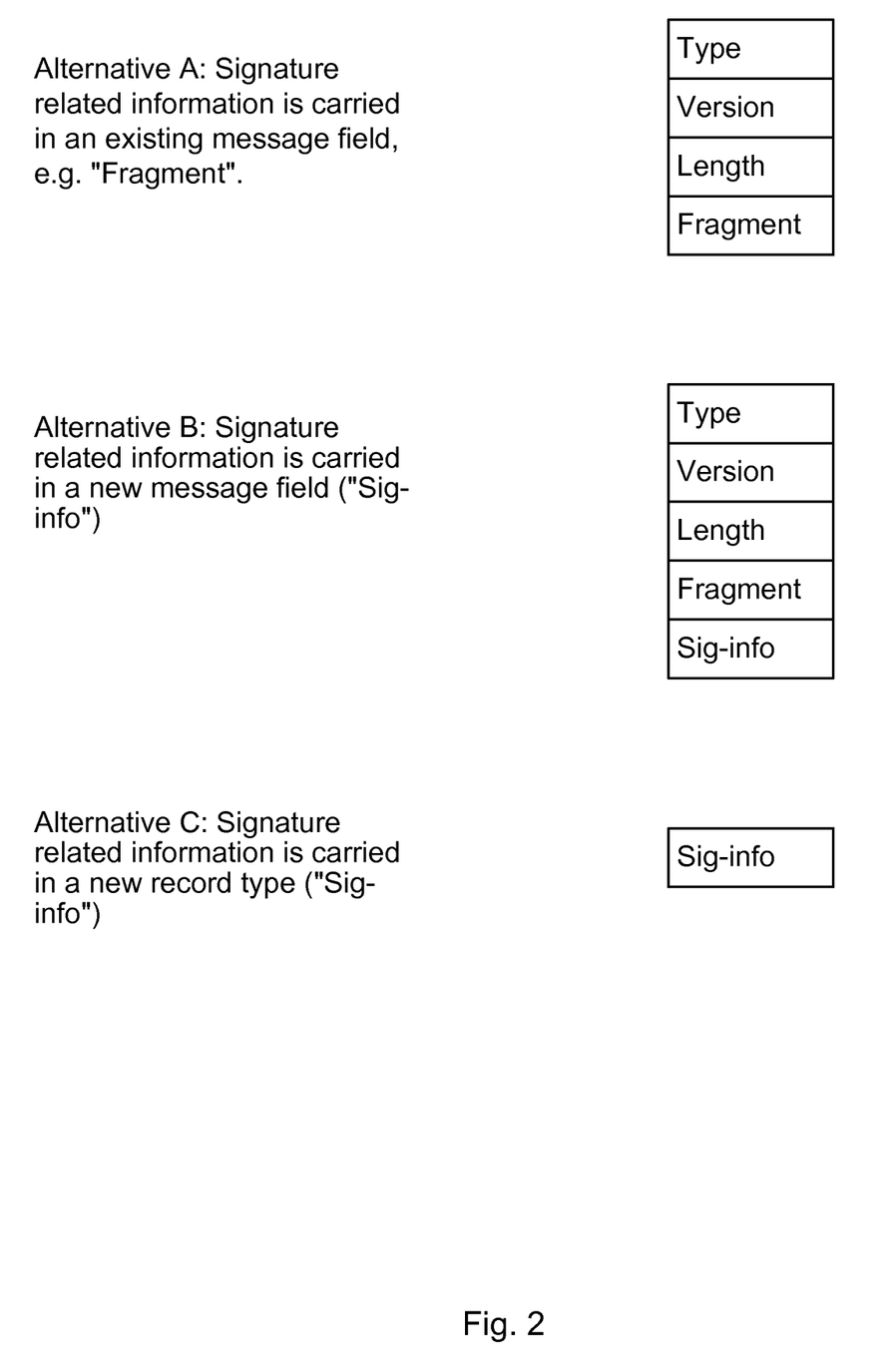
FIG. 2 schematically illustrates alternatives for TISCiphertext messages.

In the Record Layer for TLS 1.2, the format of TLSCiphertext (Section 6.2 of [The Transport Layer Security (TIS) Protocol Version 1.2]) consists of Type, Version, Length and Fragment, which is illustrated in FIG. 2.

As presented herein, signature verification related information may be included in an existing message field such as e.g. "Fragment" of the TLSCiphertext, see alternative A in FIG. 2. Alternatively signature verification related information may be included as an additional message field, here called Sig-Info, see alternative B in FIG. 2. As yet an alternative, the signature verification related information may be included as a separate record field, e.g. a new record type, here called Sig-Info, see alternative C in FIG. 2.

Signature verification related information may alternatively be carried outside the record layer, e.g. in the payload, body, header or extension of a hypermedia such as HTTP or CoAP.

Since the signature can be used to verify the integrity of the message, a new TLSCiphertext without Message Authentication Code (MAC) may be defined as presented herein.

Message Content

Signature verification related information may be included in a TLS multicast message, as presented herein. Signature verification related information may e.g. be one or multiple digital signatures, signatures with message recovery, compressed or partial or compressed signature information. Signature verification related information may also be information about where to retrieve a signature such as a reference (address, location).

The signature may cover all the other fields in the message, or only selected parts of the message, e.g. the "Fragment", or additional information not carried in the message e.g. for overhead reasons, including session identifier, or sequence number.

Signature Verification Key

Public signature keys or keys with wherein the signature(s) can be verified may be obtained by the listener in different ways. The TLS Record Layer protocol may carry the public signature key(s) or partial or compressed information about the public signature key(s), such as the hash of public signature key, and/or a reference to where the key can be retrieved.

Figure 5:
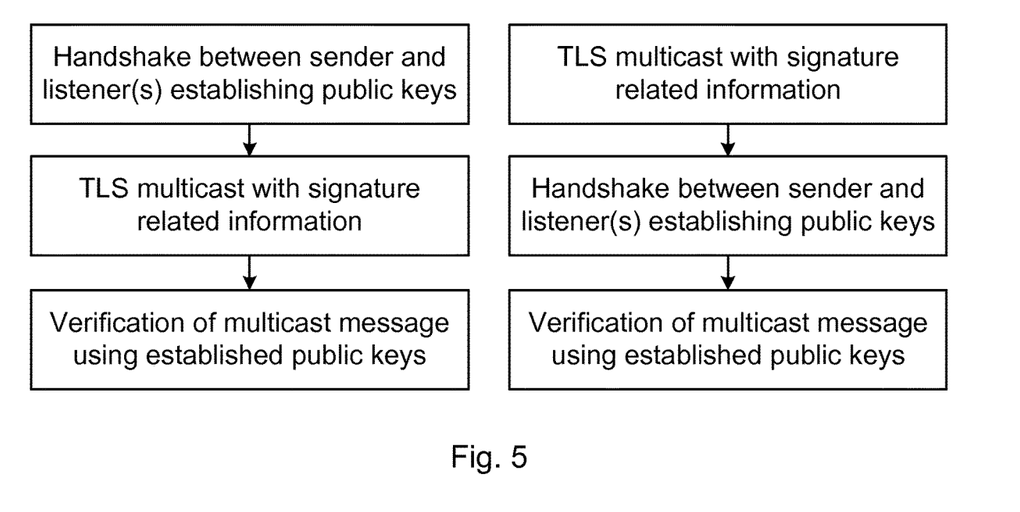
FIG. 5 schematically illustrates multicast, integrated handshake.

An alternative embodiment is that the public signature key is acquired as part of the TLS handshake. The TIS handshake may include a certificate containing a public signature key being sent to the listener. For example the listener may take the role of TLS client and run the handshake with the sender as TLS server to obtain its certificate. Alternatively, a public signature key or public signature key certificate to be used with message signature verification may be sent as part of the Handshake. Other options are described in locating signatures and public signature keys hereafter. The certificate may be a raw public signature key as in [Using Raw Public signature keys in Transport Layer Security (TIS) and Datagram Transport Layer Security (DTLS)]. Two alternative sequences for acquiring the public signature key are illustrated in FIG. 5. The public signature key may also be acquired through a key distribution scheme, e.g. based on Authentication and Authorization for Constrained Environments (ACE), IETF Internet Draft draft-ietf-ace-oauth-authz-16.

Any digital signature algorithm may be used, e.g. Digital Signature Algorithm (DSA) or Elliptic Curve DSA (ECDSA).

TLS and DTLS Specific Features

In TLS the application message may contain part of a record layer or several TLS records. In DTLS the application message often contains an integral number of records.

The term message as used herein may refer to one record, multiple records, a part of a record, or multiple records plus a part of record.

For example, the signature may cover a number of TLS/DTIS records included in one message. The signature verification related information based on the message may be included based on different criteria, for example signature verification related information may included in e.g. every third record (covering a number of records), every 500 bytes etc., every 30 seconds etc. using one of the different alternative message formats for including the signature verification related information described above.

Locating Signatures and Public Signature Keys

The information about where to find a signature or a public signature key relevant to verify a TLS multicast message may be carried in either handshake or record layer. In either case, this information may be 1. a location (e.g. Uniform Resource Identifier (URI)) of the signature
2. a location (e.g. URI) of the public signature key
3. a new message field containing the public signature key for verifying the record layer signature Alternatively, there may be an indication that the same public signature key is to be used as that which was used to authenticate the sender in the Handshake. This may also be agreed between the listening node and the sending node out of band or defined in a specification.

In order to locate the relevant signature for a given message, different approaches may be used—

The URI may be parametrised such that essentially the same URIs are used modulo some parameter variation, e.g. in part of the URI, such as the query part. The URI may e.g. contain the identifier for the session and/or Record Layer sequence number.

Alternatively, a session identifier and/or sequence number may be carried in other locations in a message, e.g. in the payload/body or header/extension of a hypertext transport protocol (HTP)/Constrained Application Protocol (CoAP) message.

In the following the use of IP multicast is assumed as an example.

The sender decides on IP multicast group and generates a message. The message is encoded with TIS, for example as described in [DTIS-based Multicast Security in Constrained Environments].

Figure 3:
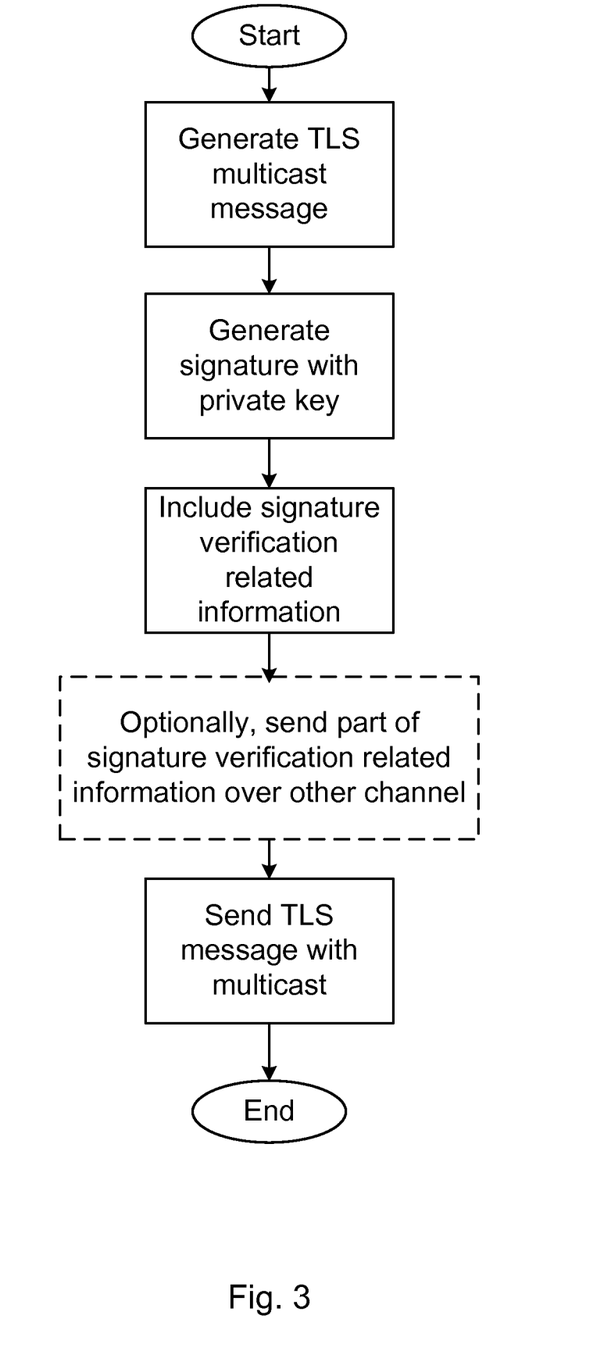
FIG. 3 schematically illustrates sender processing.

According to an embodiment, as illustrated in FIG. 3, the sender calculates a signature over a specified part of the message. The signature verification related information is included in the message.

If the signature in itself is not included in the message, the sender makes the signature available in some other way, for example, publishes the signature to a signature repository, and references the signature in the signature verification related information provided in the message.

The sender may optionally also need to make its public signature key available to listeners that do not (yet) have access to the public signature key.

The step may alternatively be performed after the sender sends the TLS multicast message.

The sender sends the TLS multicast message with signature verification related information.

Figure 4:
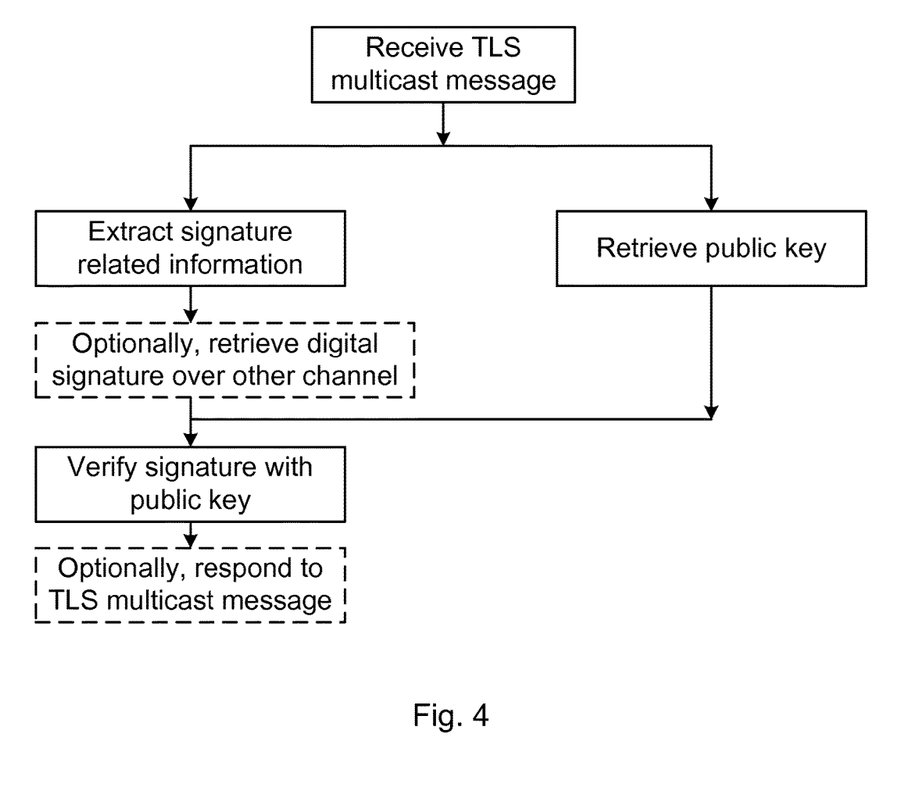
FIG. 4 schematically illustrates listener processing.

The listener receives the TIS multicast message containing signature verification related information, as illustrated in FIG. 4.

The listener extracts signature verification related information. Based on the signature verification related information, the listener acquires the digital signature. The listener also acquires the public signature key. Different options are possible. The message may contain the digital signature and the public signature key of the sender may be known to the listener, in which case the listener can proceed directly to verification of the signature. Alternatively, the digital signature and/or the public signature key needs to be retrieved first. The signature may for example be retrieved from a signature repository, as described previously in this section. The public signature key may for example be retrieved by running the TIS Handshake with the sender as described above.

Once the signature and public signature key are available, the listener can verify the signature.

The listener may respond to a TIS message with signature verification related information with another TIS message with signature verification related information. For unicast response to multicast requests, the listener would generate the signature and the original sender would verify the signature of the message sent back with a unicast TIS message augmented with a signature.

The secure group communication presented herein may for example be used in building automation settings where a number of devices need to be activated, such as a lighting system with multiple luminaries and multiple light switches. Another example is alarm-induced actuations, where multiple alarm bells should be triggered, or fire doors closed.

The secure group communication presented herein may be applied independent of how the messages are distributed between sender and listener. One example is the use of multicast IP, where the sender uses a multicast IP address and IP routing functionality makes the message available to any listener within that address range. Another example is to use a radio resource available for multiple listeners such as a broadcast channel of a radio access technology in which case the message can be made available to all devices listening to that resource channel. A third example is the use a middle box which fans out a message from a sender to multiple listeners using unicast between the middle box and the listener.

Figure 7:
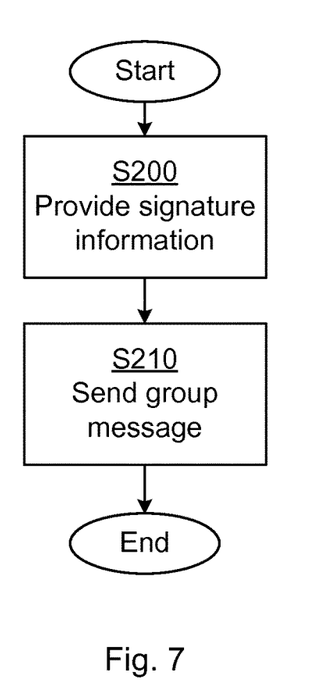

A method, according to an embodiment, for enabling secure group communication in a communication network is presented with reference to FIG. 7. The method is performed in a sending node 2 and comprises providing S200 signature verification related information to a plurality of listening nodes 1 and sending S210 a group message to the plurality of listening nodes 1, the group message comprising signature verification related information of the sending node.

At least part of the signature verification related information may be provided by a key exchange procedure.

At least part of the signature verification related information may be provided by a key distribution procedure.

At least part of the signature verification related information may be provided by a record layer procedure.

The signature verification related information may be one or more of the following: a digital signature, a signature with message recovery, compressed or partial signature information, and an indication of where or how to retrieve a signature, a public signature key, an indication of where or how to retrieve a public signature key.

The signature verification related information may be comprised in a message field intended for other use.

The signature verification related information may be comprised in a message field dedicated for signature verification related information.

The group message, one or more fields of the group message, or the whole group message, may be encoded with a private signature key related to the signature verification related information.

The providing step may comprise one or more of the following: providing a public signature key by a handshake protocol with one or more listening nodes or by a record layer protocol with one or more listening nodes.

The group message may be a transport record layer, TLS, multicast message. The TLS multicast message may be sent in the record layer for version 1.2. The group message may be sent without message authentication code, MAC.

Figure 6:
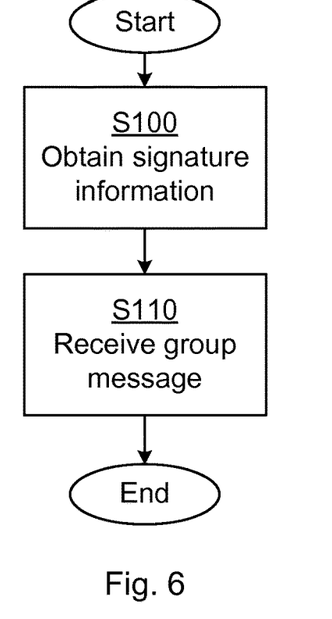
FIGS. 6-7 are flow charts illustrating methods according to embodiments presented herein.

A method, according to an embodiment, for enabling secure group communication in a communication network is presented with reference to FIG. 6. The method is performed in a listening node 1 and comprises obtaining S100 signature verification related information from a sending node 2, and receiving S110 a group message from the sending node comprising signature verification related information of the sending node.

At least part of the signature verification related information may be provided by a key exchange procedure.

At least part of the signature verification related information may be provided by a key distribution procedure.

A part of the signature verification related information may be provided by other means, e.g. a key distribution procedure. The parts of the signature verification related information may be provided at different times, in particular in a different handshake procedure or a different record layer procedure.

Part of the signature verification related information may be provided by other means, e.g. a key distribution procedure. The parts of the signature verification related information may be provided at different times, in particular in different handshake or record layer procedures.

At least part of the signature verification related information may be obtained by a record layer procedure.

The signature verification related information may be one or more of the following: a digital signature, a signature with message recovery, compressed or partial signature information, and an indication of where or how to retrieve a signature, a public signature key, an indication of where or how to retrieve a public signature key.

The signature verification related information may be comprised in a message field intended for other use.

The signature verification related information may be comprised in a message field dedicated for signature verification related information.

The group message, one or more fields of the group message, or the whole group message, may be encoded with a private signature key related to the signature verification related information, and the sending node is verified by a public signature key related to the signature verification related information.

The obtaining step may comprise one or more of the following: obtaining a public signature key by a handshake protocol with the sending node or by a record layer protocol with the sending node.

The group message may be a transport record layer, TLS, multicast message. The TLS multicast message may be received in the record layer for version 1.2. The group message may be sent without message authentication code, MAC.

Figure 9:
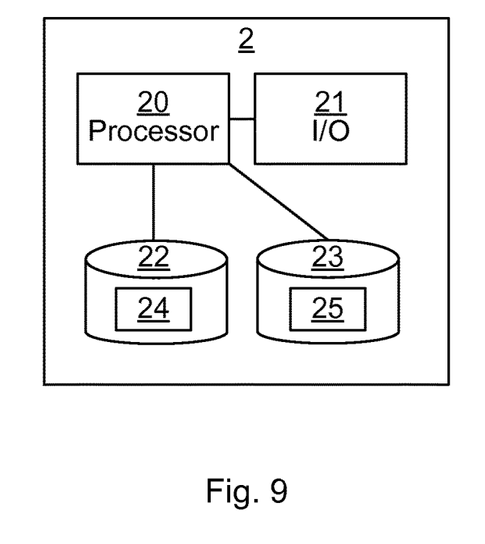

A sending node, according to an embodiment, for enabling secure group communication in a communication network is presented with reference to FIG. 9. The sending node 2 comprises a processor 20 and a computer program product 22, 23. The computer program product stores instructions that, when executed by the processor, causes the sending node to provide S200 signature verification related information to a plurality of listening nodes 1, and to send S210 a group message to the plurality of listening nodes 1, the group message comprising signature verification related information of the sending node.

At least part of the signature verification related information may be provided by a key exchange procedure.

At least part of the signature verification related information may be provided by a key distribution procedure.

At least part of the signature verification related information may be provided by a record layer procedure.

The signature verification related information may be one or more of the following: a digital signature, a signature with message recovery, compressed or partial signature information, and an indication of where or how to retrieve a signature, a public signature key, an indication of where or how to retrieve a public signature key.

The signature verification related information may be comprised in a message field intended for other use.

The signature verification related information may be comprised in a message field dedicated for signature verification related information.

The group message, one or more fields of the group message, or the whole group message, may be encoded with a private signature key related to the signature verification related information.

The providing step may comprise one or more of the following: providing a public signature key by a handshake protocol with one or more listening nodes or by a record layer protocol with one or more listening nodes.

The group message may be a transport record layer, TLS, multicast message. The TLS multicast message may be sent in the record layer for version 1.2. The group message may be sent without message authentication code, MAC.

Figure 8:
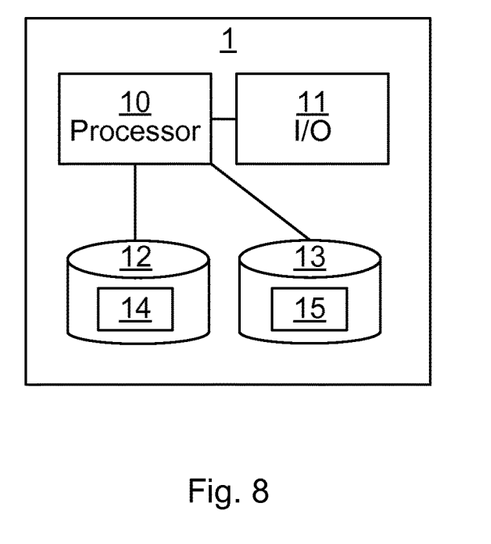
FIGS. 8-9 are schematic diagrams illustrating some components of entities presented herein.

A listening node, according to an embodiment, for enabling secure group communication in a communication network is presented with reference to FIG. 8. The listening node 1 comprises a processor 10 and a computer program product 12, 13. The computer program product stores instructions that, when executed by the processor, causes the listening node to obtain S100 signature verification related information from a sending node 2, and to receive S110 a group message from the sending node comprising signature verification related information of the sending node.

At least part of the signature verification related information may be obtained by a key exchange procedure.

At least part of the signature verification related information may be obtained by a key distribution procedure.

At least part of the signature verification related information may be obtained by a record layer procedure.

The signature verification related information may be one or more of the following: a digital signature, a signature with message recovery, compressed or partial signature information, and an indication of where or how to retrieve a signature, a public signature key, an indication of where or how to retrieve a public signature key.

The signature verification related information may be comprised in a message field intended for other use.

The signature verification related information may be comprised in a message field dedicated for signature verification related information.

The group message, one or more fields of the group message, or the whole group message, may be encoded with a private signature key related to the signature verification related information, and the sending node is verified by a public signature key related to the signature verification related information.

The obtain step may comprise one or more of the following: obtaining a public signature key by a handshake protocol with the sending node or by a record layer protocol with the sending node.

The group message may be a transport record layer, TIS, multicast message. The TIS multicast message may be received in the record layer for version 1.2. The group message may be sent without message authentication code, MAC.

Figure 11:
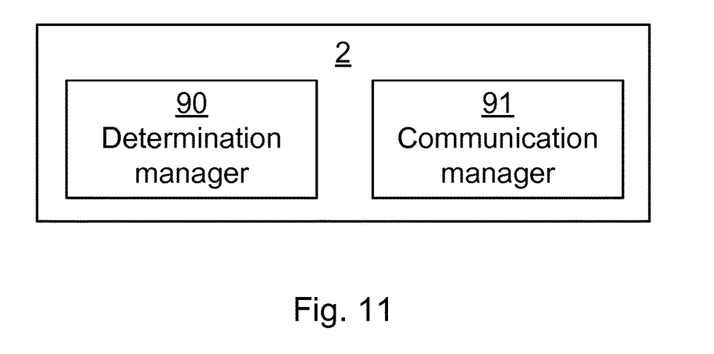

A sending node, according to an embodiment, for enabling secure group communication in a communication network is presented with reference to FIG. 11. The sending node 2 comprises a communication manager 91 for providing S200 signature verification related information to a plurality of listening nodes 1, and for sending S210 a group message to the plurality of listening nodes 1, the group message comprising signature verification related information of the sending node.

Figure 10:
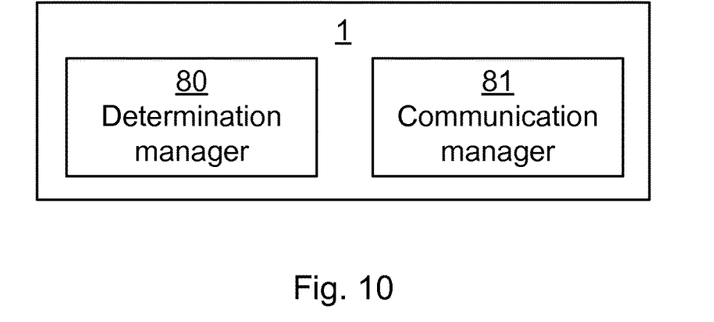
FIGS. 10-11 are schematic diagrams showing functional modules of embodiments presented herein.

A listening node, according to an embodiment, for enabling secure group communication in a communication network is presented with reference to FIG. 10. The listening node 1 comprises a communication manager 81 for obtaining S100 signature verification related information from a sending node 2, and for receiving S110 a group message from the sending node comprising signature verification related information of the sending node.

A computer program 24, 25, according an embodiment, for enabling secure group communication in a communication network is presented. The computer program comprises computer program code which, when run on a sending node 2, causes the sending node to provide S200 signature verification related information to a plurality of listening nodes 1, and to send S210 a group message to the plurality of listening nodes 1, the group message comprising signature verification related information of the sending node.

A computer program 14, 15, according to an embodiment, for enabling secure group communication in a communication network is presented. The computer program comprises computer program code which, when run on a listening node 1, causes the listening node to obtain S100 signature verification related information from a sending node 2, and to receive S110 a group message from the sending node comprising signature verification related information of the sending node.

A computer program product 12, 13 and 22, 23, according to an embodiment, comprises a computer program 14, 15 and 24, 25, and a computer readable storage means on which the computer program is stored.

FIG. 8 is a schematic diagram showing some components of the listening node 1. The processor 10 may be provided using any combination of one or more of a suitable central processing unit, CPU, multiprocessor, microcontroller, digital signal processor, DSP, application specific integrated circuit etc., capable of executing software instructions of a computer program 14 stored in a memory. The memory can thus be considered to be or form part of the computer program product 12. The processor 10 may be configured to execute methods described herein with reference to FIG. 6.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processor 10. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 15, to improve functionality for the listening node 1.

The listening node 1 may further comprise an input/output (I/O) interface 11 including e.g. a user interface. The listening node 1 may further comprise a receiver configured to receive signalling from other nodes, and a transmitter configured to transmit signalling to other nodes (not illustrated). Other components of the listening node 1 are omitted in order not to obscure the concepts presented herein.

FIG. 10 is a schematic diagram showing functional blocks of the listening node 1. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIG. 6, comprising a determination manager unit 80 and a communication manager unit 81. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The communication manger 81 is for enabling secure group communication in a communication network. This module corresponds to the obtaining step S100 and the receiving step S11 of FIG. 6. This module can e.g. be implemented by the processor 10 of FIG. 8, when running the computer program.

The determination manger 60 is for enabling secure group communication in a communication network. This module corresponds to decision related steps taken by the listening node 1. This module can e.g. be implemented by the processor 10 of FIG. 18, when running the computer program. This module can e.g. be implemented by the processor 10 of FIG. 8, when running the computer program.

FIG. 9 is a schematic diagram showing some components of the sending node 2. The processor 20 may be provided using any combination of one or more of a suitable central processing unit, CPU, multiprocessor, microcontroller, digital signal processor, DSP, application specific integrated circuit etc., capable of executing software instructions of a computer program 24 stored in a memory. The memory can thus be considered to be or form part of the computer program product 22. The processor 20 may be configured to execute methods described herein with reference to FIG. 7.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 23 in the form of a data memory may also be provided, e.g. for reading and/or storing data during execution of software instructions in the processor 20. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 25, to improve functionality for the sending node 2.

The sending node 2 may further comprise an input/output (I/O) interface 21 including e.g. a user interface. The sending node 2 may further comprise a receiver configured to receive signalling from other nodes, and a transmitter configured to transmit signalling to other nodes (not illustrated). Other components of the sending node 2 are omitted in order not to obscure the concepts presented herein.

FIG. 11 is a schematic diagram showing functional blocks of the sending node 2. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIG. 7, comprising a determination manager unit go and a communication manager unit 91. In the embodiments where one or more of the modules are implemented by a computer program, it shall be understood that these modules do not necessarily correspond to process modules but can be written as instructions according to a programming language in which they would be implemented, since some programming languages do not typically contain process modules.

The communication manger 91 is for enabling secure group communication in a communication network. This module corresponds to the provide step S200 and the send step S210 of FIG. 7. This module can e.g. be implemented by the processor 20 of FIG. 9, when running the computer program.

The determination manger 90 is for enabling secure group communication in a communication network. This module corresponds to decision related steps performed in the sending node 2. This module can e.g. be implemented by the processor 20 of FIG. 9, when running the computer program.

The invention has mainly been described above with reference to a few embodiments. However, as is readily appreciated by a person skilled in the art, other embodiments than the ones disclosed above are equally possible within the scope of the invention, as defined by the appended claims.

The invention claimed is:

1. A method for enabling secure group communication in a communication network, the method being performed in a sending node and comprising:
    providing signature verification related information to a plurality of listening nodes, wherein the signature verification related information includes a signature with message recovery, compressed or partial signature information, and one or more of a digital signature, an indication of where or how to retrieve a signature, a public signature key, or an indication of where or how to retrieve the public signature key, wherein the signature verification related information is included in every third record, every 500 bytes, or every 30 seconds, and wherein the signature verification related information is comprised in a message field intended for other use; and
    sending a group message to the plurality of listening nodes, the group message comprising the signature verification related information of the sending node.

2. The method according to claim 1, wherein at least part of the signature verification related information is provided by a key exchange procedure.

3. The method according to claim 1, wherein at least part of the signature verification related information is provided by a key distribution procedure.

4. The method according to claim 1, wherein at least part of the signature verification related information is provided by a record layer procedure.

5. The method according to claim 1, wherein the group message, one or more fields of the group message, or the whole group message, is encoded with a private signature key related to the signature verification related information.

6. The method according to claim 1, wherein the providing step comprises one or more of the following: providing the public signature key by a handshake protocol with one or more listening nodes or by a record layer protocol with one or more listening nodes.

7. A method for enabling secure group communication in a communication network, the method being performed in a listening node and comprising:
    obtaining signature verification related information from a sending node, wherein the signature verification related information includes a signature with message recovery, compressed or partial signature information, and one or more of a digital signature, an indication of where or how to retrieve a signature, a public signature key, or an indication of where or how to retrieve the public signature key, wherein the signature verification related information is included in every third record, every 500 bytes, or every 30 seconds, and wherein the signature verification related information is comprised in a message field intended for other use; and
    receiving a group message from the sending node comprising the signature verification related information of the sending node.

8. The method according to claim 7, wherein at least part of the signature verification related information is obtained by a key exchange procedure.

9. The method according to claim 7, wherein at least part of the signature verification related information is obtained by a key distribution procedure.

10. The method according to claim 7, wherein at least part of the signature verification related information is obtained by a record layer procedure.

11. The method according to claim 7, wherein the group message, one or more fields of the group message, or the whole group message, is encoded with a private signature key related to the signature verification related information, and the sending node is verified by the public signature key related to the signature verification related information.

12. The method according to claim 7, wherein the obtaining step comprises one or more of the following: obtaining the public signature key by a handshake protocol with the sending node or by a record layer protocol with the sending node.

13. A sending node for enabling secure group communication in a communication network, the sending node comprising:
a processor; and
a non-transitory computer readable storage medium storing one or more instructions that, when executed by the processor, causes the sending node to:
provide signature verification related information to a plurality of listening nodes, wherein the signature verification related information includes a signature with message recovery, compressed or partial signature information, and one or more of a digital signature, an indication of where or how to retrieve a signature, a public signature key, or an indication of where or how to retrieve the public signature key, wherein the signature verification related information is included in every third record, every 500 bytes, or every 30 seconds, and wherein the signature verification related information is comprised in a message field intended for other use; and
send a group message to the plurality of listening nodes, the group message comprising the signature verification related information of the sending node.

14. A listening node for enabling secure group communication in a communication network, the listening node comprising:
a processor; and
a non-transitory computer readable storage medium storing one or more instructions that, when executed by the processor, causes the listening node to:
obtain signature verification related information from a sending node, wherein the signature verification related information includes a signature with message recovery, compressed or partial signature information, and one or more of a digital signature, an indication of where or how to retrieve a signature, a public signature key, or an indication of where or how to retrieve the public signature key, wherein the signature verification related information is included in every third record, every 500 bytes, or every 30 seconds, and wherein the signature verification related information is comprised in a message field intended for other use; and
receive a group message from the sending node comprising the signature verification related information of the sending node.

15. The method according to claim 1, wherein the signature verification related information is comprised in a message field dedicated for signature verification related information.

\* \* \* \* \*